Figure 1:
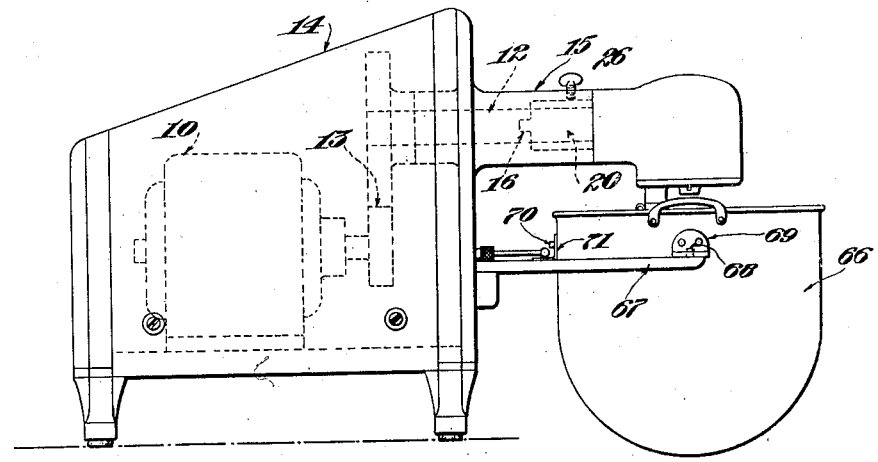

Feb. 3, 1931. O. R. DECKERT 1,791,161
KITCHEN APPLIANCE
Filed Oct. 28, 1927 2 Sheets-Sheet 1

Inventor
Oscar Robert Deckert
by his attorneys
Van Ever Fish Hildreth ◊ Cary

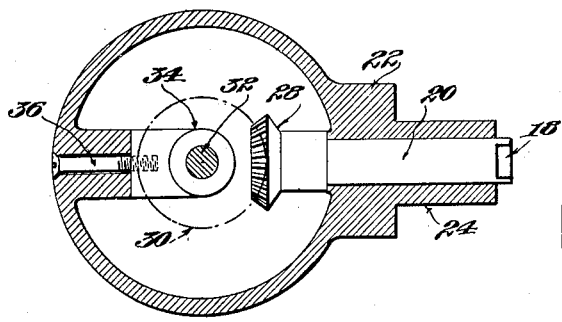
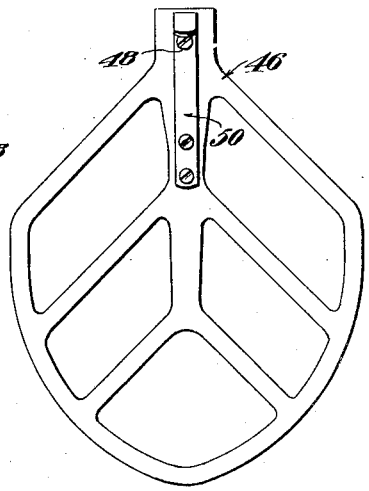
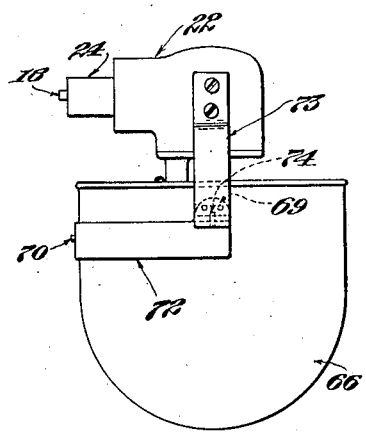
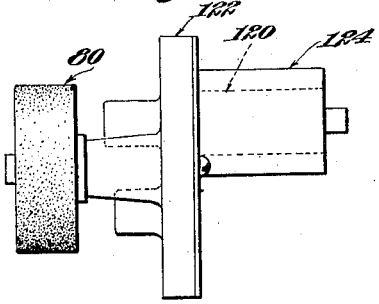
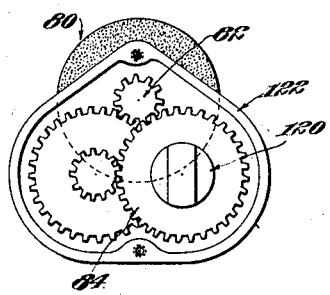
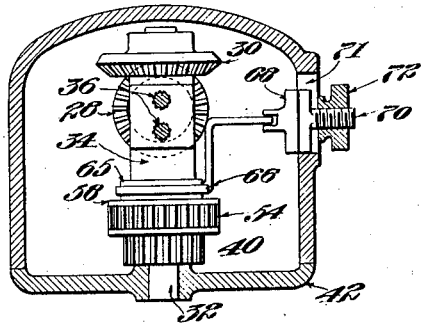

Patented Feb. 3, 1931

1,791,161

UNITED STATES PATENT OFFICE

OSCAR ROBERT DECKERT, OF BOSTON, MASSACHUSETTS

KITCHEN APPLIANCE

Application filed October 28, 1927. Serial No. 229,473.

The present invention relates to kitchen appliances and more particularly, to kitchen appliances operated mechanically, such as beaters, grinders and the like.

Kitchen appliances of this general nature ordinarily employ an electric motor having provision for connection thereto of one or more tool units. Inasmuch as the different units are designed to operate at different speeds, it is necessary, in order that all of the units may be operated from the same motor shaft, that provision be made for variable motor speed or for a change speed mechanism between the motor and the driving shaft. In some devices, there is provided a plurality of shafts extending outwardly from the motor housing and continuously operated at different speeds, the desired unit being connected with the shaft which operates at the proper speed. The disadvantages of this construction are that the gearing associated with the motor and the various shafts is expensive, and that each unit is adaptable for attachment to one only of the protruding shafts, so that additional units, which may be designed to operate at different speeds, may not find any suitable place of application to the driving means. Moreover, the presence of idly rotating external shafts not only causes a loss of power, but may also constitute a source of danger.

One of the objects of the present invention is to provide a simple and inexpensive kitchen appliance having a single driving shaft operated at constant speed and a plurality of detachable tool units driven thereby, each at its proper speed. A further object is to provide for a variation in the speed of a tool unit in a simple and inexpensive manner.

With these and other objects in view as will hereinafter appear, the principal feature of the present invention consists in a motor having a constant speed driving shaft in combination with one or more demountable tool units each having self-contained driving mechanism whereby the tool will be operated from the constant speed driving shaft at the correct tool speed. For example, a beater and a grinder, which necessarily operate at widely different speeds, may be employed interchangeably by connection to the single constant speed shaft of the motor unit.

Another feature of the invention particularly applicable to the beater, consists in means for imparting to the beater a rotation about its own axis as well as an orbital rotation, together with means for varying the speed of rotation about its axis independently of the orbital speed. Inasmuch as the beating action is principally performed by the rotation on the axis of the beater and the purpose of the orbital rotation is to bring the beater into engagement with all particles of the material, the orbital rotation may be maintained constant while the axial rotation is varied in accordance with the material to be beaten. Thus, for heavy work such as dough mixing, the beater will be driven at a slow speed, while for lighter work, such as whipping, the beater may be driven at an increased speed.

Figure 2:
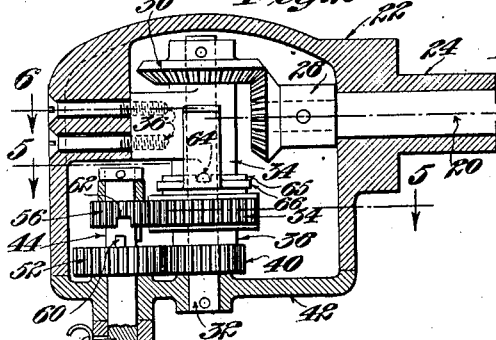
Figure 4:
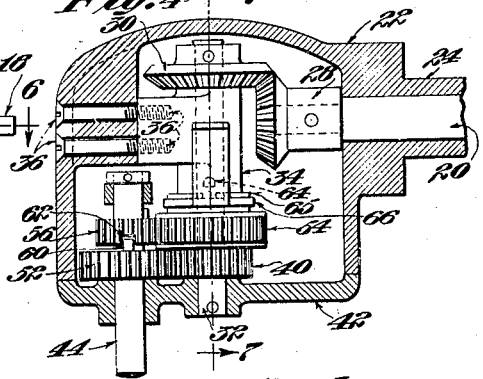
Figures 3, 5:
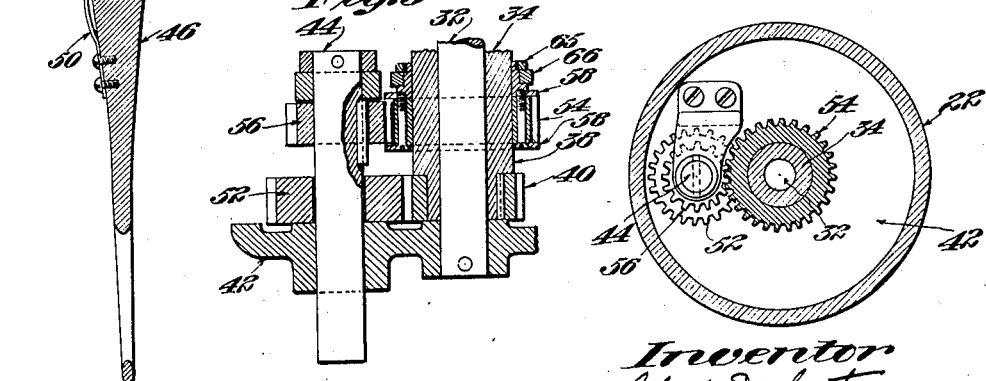

In the accompanying drawings illustrating the preferred form of the invention, Fig. 1 is a side elevation of the appliance with the beater tool in position for operation; Fig. 2 is a vertical sectional elevation of the beater tool in position for high speed operation of the beater; Fig. 3 is a detail sectional view on an enlarged scale of a portion of the apparatus shown in Fig. 2; Fig. 4 is a vertical sectional elevation of the beater unit in position for low speed operation; Fig. 5 is a section on line 5—5 of Fig. 2; Fig. 6 is a section on line 6—6 of Fig. 2; Fig. 7 is a section on line 7—7 of Fig. 4; Fig. 8 is a detail view of a form of beater; Fig. 9 is a plan of the grinder unit; Fig. 10 is a rear elevation of the grinder unit; and Fig. 11 is a side elevation of a modified form of beater unit.

The illustrated embodiment of the invention comprises an electric motor 10 connected to rotate a constant speed driving shaft 12. As shown in Fig. 1, the shaft is conveniently rotated through reduction gearing 13 contained within the motor housing 14. The end of the shaft 12 is journaled in a sleeve 15 protruding from the motor housing. The end of the shaft 12 is provided with a groove 16 which is adapted to be engaged by the tongue 18 of a shaft 20 forming a part of the tool unit to be attached to the motor. In the appliance herein shown and described, two tool units are provided, first, a beater unit which is adapted for relatively slow speed and second, a grinder which normally runs at a considerably higher speed. The speed of the unit is in each case determined by gearing contained in the unit itself and does not require any variation in the speed of the shaft 12.

Referring first to the beater unit shown in Figs. 1 to 8, the unit comprises a housing 22 formed with a sleeve 24 which projects into the sleeve 15 of the motor housing in such a position that the tongue 18 of the shaft 20 is received in the groove of the motor shaft. The unit is then held in position by a set screw 26. The end of the shaft 20 inside the housing 22 carries a bevel gear 28 which meshes with a bevel gear 30 on the vertical main shaft 32 of the beater unit. The shaft is journaled in a bearing 34 and is secured to the housing by bolts 36. The bearing 34 is extended to form a sleeve 38 to the end of which is fixed a stationary gear 40. On the end of the shaft 32 and secured for rotation therewith is a frame 42 in the form of a circular plate acting as a closure for the bottom of the housing. A tool shaft 44 is journaled in the frame eccentrically of the axis of the shaft 32 in such a manner that rotation of the shaft 32 and consequent rotation of the frame causes an orbital movement of the tool shaft 44. A beater 46, illustrated as one of the grid type, is received on the end of the shaft 44, being secured by a pin 48 entering an opening in the side of the shaft 44 and maintained in position by flat spring 50.

Provision is made for rotating the beater about the axis of the shaft 44 and for permitting such rotation at either high or low speed while maintaining the speed of the main shaft 32 constant. To this end, a low speed and a high speed driving mechanism are provided, the former consisting of the stationary gear 40 and a gear 52 which is loosely received on the tool shaft, while the high speed mechanism comprises a gear 54 loosely received on the sleeve 38 and a smaller gear 56 splined on the tool shaft. The gears 54 and 56 are adapted for vertical movement and are constrained to move together by means of two disks 58 secured to the top and bottom of the gear 54 and overlying the edge of the gear 56. When the gears 54 and 56 are in their lowermost position, the gears 52 and 56 are connected together through a pin 60 mounted on the former and engaging in a slot 62 on the latter. When the high speed gears are raised to the upper position shown in Figs. 2 and 3, the pin 60 is disengaged from the slot 62, and a pin 64 on the bearing sleeve 38 engages in a slot in the hub 65 of the gear 54 to hold the latter stationary.

The gears are raised and lowered for either high or low speed operation of the tool shaft by means of a yoke 66 received in an annular groove of the hub 65 and connected with a sliding plate 68 which has a bolt 70 extending outwardly through a vertical slot 71 in the housing. A manually operated nut 72 is received on the bolt and serves to clamp the plate 68 in adjusted position with respect to the housing. For high speed operation, the plate and yoke assembly is lifted to its uppermost position as limited by the slot 70, and for low speed rotation, the assembly is clamped in its lower position.

For low speed operation, when the parts are in the position of Fig. 4, the frame is rotated by the shaft 32 and the gear 52 in traveling around the stationary gear 40, causes rotation of the beater shaft. The gear 56 is rotated because of the connection through the pin 60 and slot 62 and this connection is effective to rotate the tool shaft. The gear 54 being loose on the sleeve 38, rotates idly. For high speed operation, the gear 54 is fixed against rotation on the sleeve 38 and the tool shaft is rotated at a speed determined by the ratio between the gears 54 and 56. This ratio is higher than that between the gears 40 and 52. During high speed operation, the gear 52 idles on the tool shaft. In either case, the orbital speed of the tool, which is the speed of rotation of the shaft 32, is constant and is determined by the ratio of the bevel gears 28 and 30.

The beater 46 rotates in a mixing bowl 66 which is removably supported on a semi-circular yoke 67 secured to the front of the motor housing 10. The ends of the yoke carry pins 68 which are received in openings on positioning brackets 69 attached to the bowl. The bowl is further supported and positioned by a pin 70 secured to the rear of the bowl and cooperating with a bracket 71 which is secured to the yoke.

A modified form of mixing bowl support is shown in Fig. 11. In this construction, the yoke 72 is formed as a semi-circular strap partially surrounding the bowl. The yoke is formed at its ends with upstanding arms 73 attached to opposite sides of the gear housing 22. Only one side of the yoke is shown in the drawing, the opposite side being attached to the housing in similar fashion. The yoke is provided with pins 74 to cooperate with the brackets 69 of the bowl, and the positioning pin 71 of the bowl is adapted to be received in an opening in the rear of the positioning strap. By this construction the bowl support is removed and attached with the tool unit. The complete assembly, including the gear housing and the bowl support, may be applied to any existing motor driving units.

This is a feature of great advantage since it permits any existing driving unit which is not equipped with the special gearing necessary to produce both rotational and orbital movement for beating or mixing, but has only the single driving shaft for operating a meat chopper or grinder or similar appliance, being changed or altered into a beating or mixing machine of this type merely by the substitution of this beater unit with its self-contained, special gearing, for the meat chopper or grinder or whatever tool unit the machine may then have been provided with. Furthermore, even in those machines having built in beater gearing for producing this rotational and orbital movement, such demountable unit is a valuable auxiliary since it not only permits the mixing of two different and distinct batches at the same time, but also, when supplied in the small size, enables the machine to be operated upon small amounts which cannot be properly or economically mixed or beaten with the large bowls and beaters commonly built into such machines.

The second of the tool units, shown in Figs. 9 and 10, consists of a grinding or knife sharpening unit, which comprises an abrasive wheel 80 adapted to be driven at a considerably higher speed than that of the drive shaft 12. To this end, the wheel is mounted on a shaft 82 connected through a train of gears 84 by a shaft 120 constructed similarly to the shaft 20 of the beater unit heretofore described. The gears are contained within a housing 122 which is formed with an extended sleeve 124 to be received within the sleeve 15 of the motor housing. The grinder unit is attached to the motor for rotation in an exactly similar manner to the beater unit, the speed of the grinding wheel being determined by the high speed gear ratio of the train 84. Inasmuch as the gears are self-contained in the housing of the unit, the desired speed for the grinding wheel is obtained without any change in the speed of the motor driving shaft 12.

While in the illustrated embodiment of the present invention only two specific forms of tools are shown, one driven at higher and the other at lower speed than the motor shaft, it is to be understood that the invention is not to be limited thereto, as any type of tool unit, such as a food chopper, coffee grinder, or similar device, may be constructed for attachment to the constant speed motor shaft, the speed in each case being determined by the driving connections contained in the tool unit itself, the present invention contemplating in its broader aspects, the driving of any of a plurality of units, each at its proper speed, from a single driving shaft which is rotated at a constant speed under all conditions.

The invention having been thus described, what is claimed is:

1. A kitchen appliance having, in combination, a motor, a constant speed driving shaft driven thereby, a plurality of interchangeable tool units, each having a tool and a shaft adapted for connection with the driving shaft, and gearing in each tool unit for operating the same, each at its appropriate speed and different from the speed of the driving shaft.

2. A kitchen appliance having, in combination, a motor, a motor housing having a protruding sleeve, a constant speed driving shaft driven by the motor and journaled in the sleeve, a plurality of interchangeable tool units, each having a housing provided with an extended sleeve adapted to be received in the sleeve of the motor housing, a shaft having provision for operative connection with the driving shaft, and gearing in the housing of the tool unit to drive the tool at its appropriate speed.

3. A kitchen appliance comprising a housing, a motor, a shaft driven thereby, and a combined beater and mixing bowl support, whereby the beater and support may be attached to or removed from operative connection with the motor as a unit.

4. A kitchen appliance having, in combination, a motor, a motor housing, a shaft driven by the motor, an attachable beater unit having a housing and having provision for operation by the shaft, and a mixing bowl support secured to the housing of the beater unit, whereby the combined beater unit and mixing bowl support may be unitarily attached to or removed from operative connection with the shaft.

5. Beater mechanism for a kitchen appliance having, in combination, a main shaft, a beater shaft having provision for rotation and for orbital rotation about the main shaft, means secured to the main shaft in which the beater shaft is journaled, a stationary sleeve in which the main shaft is journaled, a high speed and a low speed driving mechanism each comprising a gear on the main shaft sleeve and a gear connected with the beater shaft, and means for rotating the beater shaft on its axis selectively at high or low speed independently of its orbital rotation, said means comprising devices for selectively securing the gears of either mechanism in operative relation with the main shaft sleeve and the beater shaft respectively.

6. Beater mechanism for a kitchen appliance having, in combination, a main shaft, a beater shaft having provision for rotation about its axis and for orbital rotation about the main shaft, means secured to the main shaft having provision for supporting the beater shaft, a stationary sleeve in which the main shaft is journaled, a gear train comprising a gear fixed upon the sleeve and a beater shaft gear meshing with said gear and loosely mounted on the beater shaft, a second train of gears having a different ratio from the first train, one of which is loosely mounted on the main shaft sleeve and the other is splined on the beater shaft, means for sliding the gears of the second train longitudinally of the shafts from one position to another, means for connecting the gears on the beater shaft against relative rotation for one position of the sliding gears, and means for connecting the main shaft gear of the second train against rotation on the main shaft sleeve for the other position of the sliding gears.

7. A kitchen appliance comprising a demountable beater unit provided with a casing, a driven shaft mounted in the casing, means on the driven shaft for detachably connecting the same to a driving shaft, the casing having provision for detachably mounting the casing with said shafts connected, a main shaft operated by the driven shaft, a beater shaft parallel therewith and adjacent thereto, two pairs of intermeshing gears located within the casing for imparting from the main shaft rotation to the beater shaft about its axis at different speeds, means under the control of the operator for rendering either pair of intermeshing gears operative to control the speed of rotation of the beater shaft, and connections for imparting orbital rotation to the beater shaft about the main shaft.

8. A demountable beater mechanism for a kitchen appliance which is provided with a driving shaft, said mechanism having, in combination, a main shaft, a casing having provision for mounting upon the kitchen appliance with the main shaft in operative connection with the driving shaft of the kitchen appliance, a beater shaft mounted in the casing, gearing in the casing interposed between the main shaft and the beater shaft for imparting rotational and orbital movement to the beater shaft, and means for adjusting the gearing in the casing to vary the speed of rotation of the beater shaft about its axis independently of its orbital speed.

In testimony whereof I have signed my name to this specification.

OSCAR ROBERT DECKERT.